(12) United States Patent
Beg

(10) Patent No.: US 12,199,466 B2
(45) Date of Patent: Jan. 14, 2025

(54) UNINTERRUPTIBLE POWER SUPPLY SYSTEM AND METHOD

(71) Applicant: SCHNEIDER ELECTRIC IT CORPORATION, West Kingston, RI (US)

(72) Inventor: Mirza Akmal Beg, Pepperell, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 722 days.

(21) Appl. No.: 15/686,300

(22) Filed: Aug. 25, 2017

(65) Prior Publication Data

US 2019/0067989 A1   Feb. 28, 2019

(51) Int. Cl.
| | |
|---|---|
| H02J 9/06 | (2006.01) |
| H02J 3/38 | (2006.01) |
| H02J 3/46 | (2006.01) |
| H02J 7/00 | (2006.01) |
| H02J 7/35 | (2006.01) |

(52) U.S. Cl.
CPC .............. *H02J 9/062* (2013.01); *H02J 3/381* (2013.01); *H02J 3/388* (2020.01); *H02J 3/46* (2013.01); *H02J 7/0068* (2013.01); *H02J 7/35* (2013.01); *H02J 2300/20* (2020.01); *H02J 2300/26* (2020.01); *H02J 2300/28* (2020.01)

(58) Field of Classification Search
CPC .. H02J 9/062; H02J 7/35; H02J 7/0068; H02J 3/382; H02J 9/06; H02J 3/32; H02J 3/388; H02J 3/381; H02J 3/46; H02J 2300/28; H02J 2300/26; H02J 2300/20
See application file for complete search history.

(56) References Cited

U.S. PATENT DOCUMENTS

| | | | |
|---|---|---|---|
| 6,169,669 B1 * | 1/2001 | Choudhury | H02J 9/062 307/66 |
| 6,465,910 B2 * | 10/2002 | Young | H02J 3/32 307/43 |
| 6,605,879 B2 * | 8/2003 | Wade | H02J 9/062 307/66 |
| 7,106,607 B2 | 9/2006 | Nielsen | |
| 7,834,580 B2 | 11/2010 | Haines | |
| 7,939,968 B2 | 5/2011 | Hjort et al. | |
| 8,385,091 B2 | 2/2013 | Nielsen | |

(Continued)

FOREIGN PATENT DOCUMENTS

| | | | | |
|---|---|---|---|---|
| CN | 104011965 A | 8/2014 | | |
| WO | WO-2008133733 A1 * | 11/2008 | .......... | H02J 13/0062 |

OTHER PUBLICATIONS

Extended European Search Report from corresponding European Application No. 18190844.3 dated Nov. 22, 2018.

*Primary Examiner* — Carlos Amaya
(74) *Attorney, Agent, or Firm* — Lando & Anastasi, LLP

(57) ABSTRACT

An uninterruptible power supply includes an input configured to be coupled to a renewable power source and an energy storage component configured to receive and store energy and to provide stored power. Power circuitry is configured to receive the renewable power and the stored power and provide output power to a load. A controller coupled to the power circuitry determines whether an amount of available renewable power exceeds the output power level provided to the load and, if so, provides excess power from the renewable power to the stored energy component.

23 Claims, 5 Drawing Sheets

(56) References Cited

U.S. PATENT DOCUMENTS

| | | | |
|---|---|---|---|
| 9,559,521 B1* | 1/2017 | King | G05F 1/66 |
| 10,090,673 B1* | 10/2018 | Peck | H02J 7/35 |
| 10,826,322 B2* | 11/2020 | Colombi | H02J 9/061 |
| 2008/0217998 A1* | 9/2008 | Parmley | H02J 9/062 |
| | | | 307/65 |
| 2009/0027932 A1* | 1/2009 | Haines | H02J 9/062 |
| | | | 363/95 |
| 2009/0085404 A1* | 4/2009 | Suzuki | H02J 2207/40 |
| | | | 307/46 |
| 2009/0178423 A1* | 7/2009 | Yeh | F24F 11/30 |
| | | | 62/236 |
| 2010/0181837 A1* | 7/2010 | Seeker | H02J 3/382 |
| | | | 307/72 |
| 2011/0133552 A1 | 6/2011 | Binder et al. | |
| 2011/0140520 A1 | 6/2011 | Lee | |
| 2011/0148205 A1* | 6/2011 | Moon | H02J 3/32 |
| | | | 307/65 |
| 2011/0273022 A1* | 11/2011 | Dennis | H02J 1/10 |
| | | | 307/72 |
| 2012/0074786 A1* | 3/2012 | Johnson, Jr. | H02J 9/062 |
| | | | 307/66 |
| 2012/0112544 A1* | 5/2012 | Salcone | H02J 7/0047 |
| | | | 307/65 |
| 2012/0191252 A1* | 7/2012 | Rockenfeller | F25B 27/005 |
| | | | 700/276 |
| 2012/0191262 A1* | 7/2012 | Marcus | G06Q 30/0202 |
| | | | 700/286 |
| 2012/0293000 A1* | 11/2012 | Fan | H02J 1/102 |
| | | | 307/64 |
| 2014/0082393 A1* | 3/2014 | Liang | G06F 1/3212 |
| | | | 713/323 |
| 2014/0368043 A1* | 12/2014 | Colombi | H02J 3/32 |
| | | | 307/66 |
| 2014/0379160 A1* | 12/2014 | Fallon | G06Q 50/06 |
| | | | 700/297 |
| 2015/0256025 A1* | 9/2015 | Brhlik | H02J 3/28 |
| | | | 307/21 |
| 2016/0056617 A1* | 2/2016 | Cruz | H02J 3/382 |
| | | | 29/825 |
| 2016/0141879 A1* | 5/2016 | Motsenbocker | H02J 3/02 |
| | | | 307/18 |
| 2016/0259353 A1* | 9/2016 | Morroni | H02J 1/10 |
| 2016/0329713 A1 | 11/2016 | Berard | |
| 2017/0133852 A1* | 5/2017 | Macdonald | H02J 7/34 |
| 2017/0194791 A1 | 7/2017 | Budde | |
| 2017/0267113 A1* | 9/2017 | Harada | B60L 3/0084 |
| 2018/0076629 A1* | 3/2018 | McMorrow | H02J 3/385 |
| 2018/0196456 A1* | 7/2018 | ElBsat | G05F 1/66 |
| 2019/0052090 A1* | 2/2019 | Kobayashi | H02J 3/38 |

* cited by examiner

UNINTERRUPTIBLE POWER SUPPLY SYSTEM AND METHOD

BACKGROUND OF INVENTION

Field of the Invention

At least one example in accordance with the present invention relates generally to providing reliable power from multiple sources.

Discussion of Related Art

Solar, battery, and electric grid power systems are well known, including those that power domestic and small office locations. Solar and other renewable energy sources, e.g., wind power, are becoming increasingly prevalent for many applications and are often coupled to a public or other utility grid to provide excess power back to the electric grid when the power generated by the renewable source exceeds the needs of the local premises. Renewable power systems shut off or disconnect during an electric grid failure to prevent energizing the electrical lines of the utility which could be a hazard to individuals, such as to technicians working to repair a failure.

SUMMARY

Aspects and embodiments are generally directed to intelligent power distribution and storage systems and methods. Examples of the aspects and embodiments discussed herein address numerous power source options, including renewable energy sources, with a single integrated uninterruptible power system. Particular implementations of the example power systems described herein address the variable availability and energy capacity of renewable power sources, flexible backup storage and runtime capacity, and integration with a utility grid to allow efficient flow of power to or from the utility at various times in accord with economy, local demand, user preference, and available power sources.

According to one aspect, an uninterruptible power supply is provided that includes a renewable input configured to be coupled to a renewable power source and to receive renewable power from the renewable power source, an energy storage component configured to receive and store energy and to provide stored power, power circuitry configured to receive the renewable power and the stored power, a power output coupled to the power circuitry and configured to provide output power to a load, and a controller coupled to the power circuitry and configured to determine whether an amount of renewable power exceeds an output power level provided to the load and to provide excess power from the renewable power to the stored energy component in response to a determination that the amount of renewable power exceeds the output power level provided to the load.

Some examples also include a utility input configured to be coupled to a power grid and to receive utility power from the power grid, the power circuitry further coupled to the utility input, and the controller further configured to determine whether the power grid is operational and to provide excess power from the renewable power to the power grid in response to a determination that the amount of renewable power exceeds the output power level provided to the load and a determination that the power grid is operational.

In certain examples, the controller is further configured to disconnect the utility input in response to determining that the power grid is not operational.

In certain examples, the controller is further configured to control the power circuitry to provide the output power from the renewable power and the stored power in response to determining that the power grid is not operational.

Certain examples include at least one maximum power point tracking circuit coupled to the renewable input, wherein the controller is further configured to determine whether an amount of renewable power exceeds an output power level provided to the load by receiving information from the maximum power point tracking circuit.

In some examples, the controller is further configured to determine whether a utility rate is higher than a threshold and to control a charger of the energy storage component to disable charging of the energy storage component in response to determining that the utility rate is higher than the threshold.

In some examples, the controller is further configured to control the charger of the energy storage component by a communication interface with the charger of the energy storage component.

According to another aspect, a method of providing output power to a load is provided and includes receiving renewable power from a renewable power source, converting the renewable power into at least a portion of the output power, determining whether the renewable power exceeds a threshold, and providing a portion of the renewable power to at least one of an energy storage component and a utility grid in response to a determination that the renewable power exceeds the threshold.

Some examples also include tracking a maximum power point of the renewable power source to determine whether the renewable power exceeds the threshold.

Certain examples include determining if a power grid is operational and providing a portion of the renewable power to the power grid in response to a determination that the renewable power exceeds the threshold and to a determination that the power grid is operational. Some examples also include disconnecting a connection to the power grid in response to a determination that the power grid is not operational.

In some examples, the method includes receiving stored power from the energy storage component and converting the stored power into at least a portion of the output power in response to a determination that the renewable power does not exceed the threshold.

In some examples, the method includes receiving stored power from the energy storage component and converting the stored power into at least a portion of the output power in response to a determination that the renewable power does not exceed the threshold and a determination that a utility rate exceeds a utility rate threshold.

In certain examples, the method includes controlling a charger of the energy storage component to disable charging of the energy storage component in response to a determination that a utility rate exceeds a utility rate threshold.

According to another aspect, an uninterruptible power supply is provided that includes a utility input configured to be coupled to a power grid and to receive utility power from the power grid, a renewable input configured to be coupled to a renewable power source and to receive renewable power from the renewable power source, and means for balancing the utility power and the renewable power to provide output power to a load.

In some examples, the means for balancing the utility power and the renewable power includes means for determining whether an amount of renewable power exceeds an output power level provided to the load and to provide excess power from the renewable power to the power grid in response to a determination that the amount of renewable power exceeds the output power level provided to the load.

In some examples, an energy storage component configured to receive and store energy and to provide stored power, and wherein the means for balancing the utility power and the renewable power includes means for balancing the utility power, the renewable power, and the stored power, to provide output power to the load. In certain examples, the means for balancing the utility power, the renewable power, and the stored power further includes means for determining whether an amount of renewable power exceeds an output power level provided to the load and to provide excess power from the renewable power to at least one of the power grid or the energy storage component in response to a determination that the amount of renewable power exceeds the output power level provided to the load.

In some examples, the renewable input is further configured to receive renewable power from a renewable power source that is at least one of a photovoltaic cell and a wind generator.

Some examples also include at least one maximum power point tracking circuit coupled to the renewable input, wherein the controller is further configured to determine whether an amount of renewable power exceeds an output power level provided to the load by receiving information from the maximum power point tracking circuit.

Still other aspects, embodiments, examples, and advantages of these exemplary aspects and embodiments are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
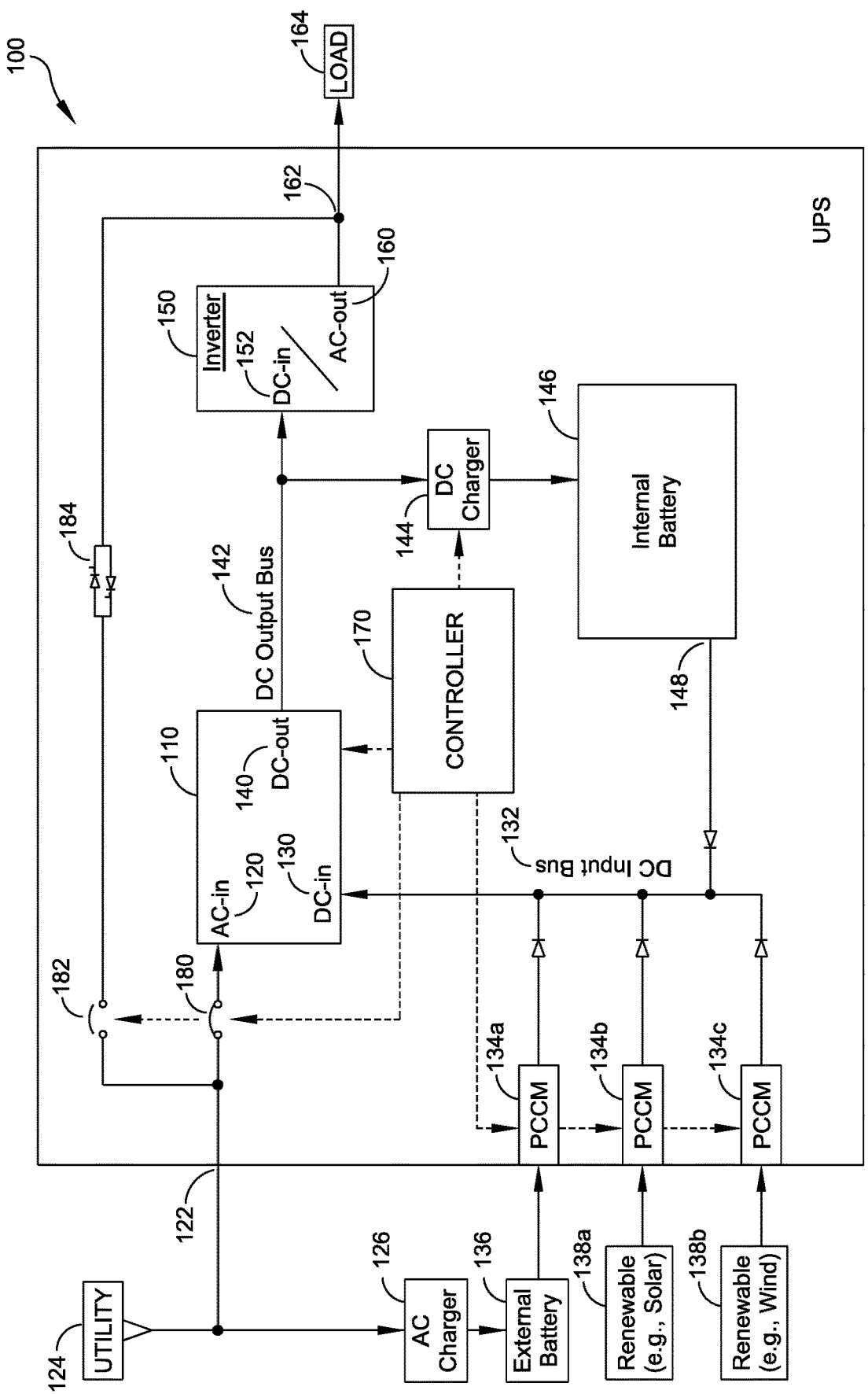
FIG. 1 is a block diagram of an example of an uninterruptible power supply (UPS) having inputs configured for renewable energy systems, according to aspects of the invention.

Systems and methods discussed herein are directed to uninterruptible power supplies having specialized accommodation for renewable power sources, such as photovoltaic cells (solar) and wind generators, integration with an electric grid of a public or other utility, and energy storage elements for backup power when necessary. The example uninterruptible power supplies discussed herein include power input modules capable of receiving power from various types of renewable and storage energy sources, and include one or more power converters, accepting power input from the power input modules and other various power sources, including both alternating current and direct current sources, whether locally connected or provided via a utility grid. The uninterruptible power supplies may include a controller that manages the amount of power received from each source, and controls the converter(s) to provide power at an output. Output power may be provided to local loads, battery chargers, fed back to a utility, or any combination of these. Renewable energy sources and battery or other storage elements are further controlled to provide output power when there is a failure in the utility grid.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, conventional renewable power systems may shut off or disconnect during an electric grid failure to prevent energizing the electrical lines of the utility which could be a hazard to individuals, such as to technicians working to repair a failure. As a result, renewable power systems may fail to provide reliable power to the premises during a grid failure. They also fail to provide backup power during an outage or shortage of the renewable power source, and also fail to provide control over sources, routing, and storage of power, such as control over the balance of power consumed from renewable source(s) versus a utility, or priority of one source over another based on time of day, utility rates, storage options, or other concerns.

Uninterruptible power supplies (UPS) are commonly used to provide regulated, uninterrupted power to sensitive and/or critical loads, or any load to which a reliable source of power is desired. FIG. 1 shows an example of a UPS 100 in accord with aspects and embodiments disclosed herein. The UPS 100 includes a converter 110 having an alternating current (AC) input 120, a direct current (DC) input 130, and a DC output 140. The DC output 140 provides power to an inverter 150 that converts DC power into AC power and provides the AC power at an AC output 160. A controller 170 controls the operation of the converter 110, the inverter 150, and various other components as discussed in more detail below, such as various switches 180, 182, and/or bypass switch 184.

The AC input 120 of the converter 110 is coupled to an AC input bus 122 to which a utility grid 124 may be connected, such as a public utility electric grid providing nominal AC electricity to homes, business, and the like. The converter 110 also has a DC input 130 coupled to a DC input bus 132 to which one or more power conditioning and control modules (PCCM) 134 are connected. Each of the PCCM's 134 is configured to accept power from a particular source of energy, such as an external battery 136, a renewable source 138, or other sources. The energy sources coupled to the PCCM may be AC or DC, but each PCCM 134 is configured to receive electric power, condition the electric power, and convert as necessary to provide DC input power on the DC input bus 132. In some examples, an external connection to the DC input bus 132 may be provided and allow connection of an external PCCM 134. Additionally, an external connection to the DC input bus 132 may allow or include a rack of one or more PCCM's 134. The controller 170 may control each of the PCCM's 134, as shown, to control the amount of power provided by each source to the DC input bus 132, whether each PCCM 134 is internal or external to the UPS 100.

Each PCCM 134 may include maximum power point tracking (MPPT) capability. For example, the PCCM 134b is shown in FIG. 1 to receive power from a renewable source 138a that is a solar cell i.e., a photovoltaic (PV) cell, that may be capable of producing more or less power at various times, e.g., more in bright sun, less in overcast conditions, none at night, etc., and the PCCM 134b may include circuitry or features to track the maximum power point the renewable source 138a can provide, and control the renewable source 138a to provide maximum power. The PCCM 134b therefore may be aware of the nature of renewable source 138a that is connected, and the PCCM 134b may include specific elements designed for, or may be specifically configured for, a solar power source. Further, a solar cell source, such as the renewable source 138a, typically provides power in DC electric form, and the PCCM 134b therefore conditions and converts the DC power received into a DC form suitable for the DC input bus 132 by, for example, converting the voltage provided and/or conditioning various characteristics of the voltage provided.

A solar cell may be coupled to the PCCM 134b without the necessity for a conventional solar inverter, because the power conversion components (e.g., the PCCM 134b, the converter 110, and/or the inverter 150) are capable of accepting power directly from a solar cell. Such a solar cell may be a standalone component and not capable of being connected directly to the load 164 or to the utility 124. In other examples, a solar cell may include some power conversion and/or may include a solar inverter and the PCCM 134b may be configured to accept power in whatever form the solar cell provides.

Similarly, the PCCM 134c shown in FIG. 1 receives power from a renewable source 138b that is a wind generator, which also may provide more or less power at various times, e.g., based upon wind condition. The PCCM 134c may include MPPT capability similar to the PCCM 134b to control the renewable source 138b to provide maximum power. The PCCM 134c may include specific elements designed for, or may be specifically configured for, a wind generator source. Further, various wind generator sources may provide electric power in a DC form while others may provide electric power in an AC form. The PCCM 134c conditions and converts the electric power received to provide power in DC form suitable for the DC input bus 132.

A wind generator may be coupled to the PCCM 134c without the necessity for an additional inverter, because the power conversion components (e.g., the PCCM 134c, the converter 110, and/or the inverter 150) are capable of accepting power directly from a wind generator. Such a wind generator may be a standalone component and not capable of being connected directly to the load 164 or to the utility 124. In other examples, a wind generator may include some power conversion and/or may include an inverter and the PCCM 134c may be configured to accept power in whatever form the wind generator provides.

A further external source of power provided on the DC input bus 132 includes storage components, such as the external battery 136. The PCCM 134a receives power from the external battery 136, as may be further controlled by the controller 170, and provides conditioned power in DC form suitable for the DC input bus 132. The example UPS 100 is shown in FIG. 1 with such an external battery 136 connected to the input of the PCCM 134a, and the external battery 136 is also connected to a charger 126, external to the UPS 100, powered by the utility grid 124. The charger 126 is a separate component and externally manages the charge level of the external battery 136 in accord with its design, potentially unaffected by the UPS 100. In different embodiments, the external battery may be implemented using a plurality of batteries or battery modules.

When external power is available from the renewable sources 138, the controller 170 may control the PCCM's 134 to provide power from the renewable sources 138 to the DC input bus 132 which is coupled to the DC input 130 of the converter 110. The PCCM's 134 may be controlled to provide the maximum renewable power available, or may be controlled to provide any lesser amount of power otherwise desired. For example, each PCCM 134 may monitor and control an output voltage provided to the DC input bus 132, and may monitor and control an amount of current provided to the DC input bus 132, and by monitoring or controlling any or both of the voltage and current the PCCM 134 may control the amount of power provided.

Various embodiments may include any number of PCCM's 134 and may include modular capability for PCCM's 134 to be added or removed, and such PCCM's 134 may be hot swappable, i.e., capable of being removed and inserted while the UPS 100 is in operation and energized. PCCM's 134 may be of a type dedicated to a specific source of power or may be configurable and/or programmable to be capable of receiving power from varying types of sources. The controller 170 may discover the type of PCCM 134 and/or the type of source, e.g., battery 136 or renewable source 138, of varying type and the like, by communication with one or more of the PCCM's 134 or by configuration by a user, or by any combination of these or other methods.

The converter 110 is configured to accept or receive DC power at the DC input 130 and AC power at the AC input 120 and to control how much power is used from each of the DC input 130 and the AC input 120 to provide power at the DC output 140. The amount of power from each of the DC input 130 and the AC input 120 may be controlled by control elements that are part of the converter 110 or elsewhere, and may be further controlled by instructions or control signals from the controller 170. An example of a converter 110 that accepts both AC input and DC input and is controllable as to input power from each to provide DC output power is disclosed in U.S. Pat. No. 7,106,607 issued on Sep. 12, 2006, and titled "COMBINED AC-DC TO DC CONVERTER, which is hereby incorporated by reference in its entirety for all purposes.

In accord with the above discussion, and still referring to FIG. 1, the converter 110 provides DC power at the DC output 140 to the DC output bus 142 to provide power to the inverter 150 and to a charger 144 that controls a charge level of an internal battery 146.

The charger 144 receives DC power from the DC output bus 142 and controls charging the internal battery 146. The internal battery 146 stores energy and acts as a reliable backup source of power at an output terminal 148 when necessary to provide backup DC power to the DC input bus 132. The charger 144 may directly manage the charge level of the battery 146 or may be further controlled by the controller 170. The charger 144 may be operated to charge the internal battery 146 whenever the internal battery 146 is not fully charged, or alternately when the internal battery 146 is below a threshold charge. Charging by the charger 144 may be conditional upon utility grid 124 power being available, renewable sources 138 being available, utility rates being below a threshold, or any combination of these, or these and other factors. Control decisions regarding power inputs, outputs, conversions, battery charging, and the like are discussed in more detail below with regard to FIG. 4

Various embodiments of a UPS in accord with those disclosed herein may include additional internal batteries such as the internal battery 146, and may include multiple or differing chargers of various configuration for one or more internal batteries. Additionally, a DC output from a battery, such as the DC output 148, may include or may be connected to a further PCCM that conditions and converts the battery output to a DC form suitable for provision to the DC input bus 132, in similar manner to the PCCM's 134 shown in FIG. 1 connected to external power sources.

Still referring to FIG. 1, the converter 110 provides DC power at the DC output 140 to provide power to the inverter 150. The inverter 150 receives the DC power at a DC input 152 and converts the DC power to AC power provided to the AC output bus 162 at the AC output 160. The AC output bus 162 provides the AC power externally, e.g., to a load 164. The AC output bus 162 may also provide AC power back to the utility grid 124 through a bypass switch 184 and/or a feedback breaker 182. For example, when the renewable sources 138 are capable of providing more power than demanded by the load 164, the UPS 100, at the control of the controller 170, may direct power from the renewable sources 138, via the converter 110, to provide enough power to the load 164 and provide excess power to the utility grid 124 directly from the converter 110 through the AC input bus 122, e.g., through an AC input breaker 180. Alternately, the controller 170 may control the AC input breaker 180 to be open (dis-connected, non-conducting) and connect the feedback breaker 182 to be closed (connected, conducting), to allow AC power from the AC output bus 162 to flow back to the utility grid 124. As mentioned above, control decisions regarding power inputs, outputs, conversions, batteries charging, and the like are discussed in more detail below with regard to FIG. 4

Figure 2:
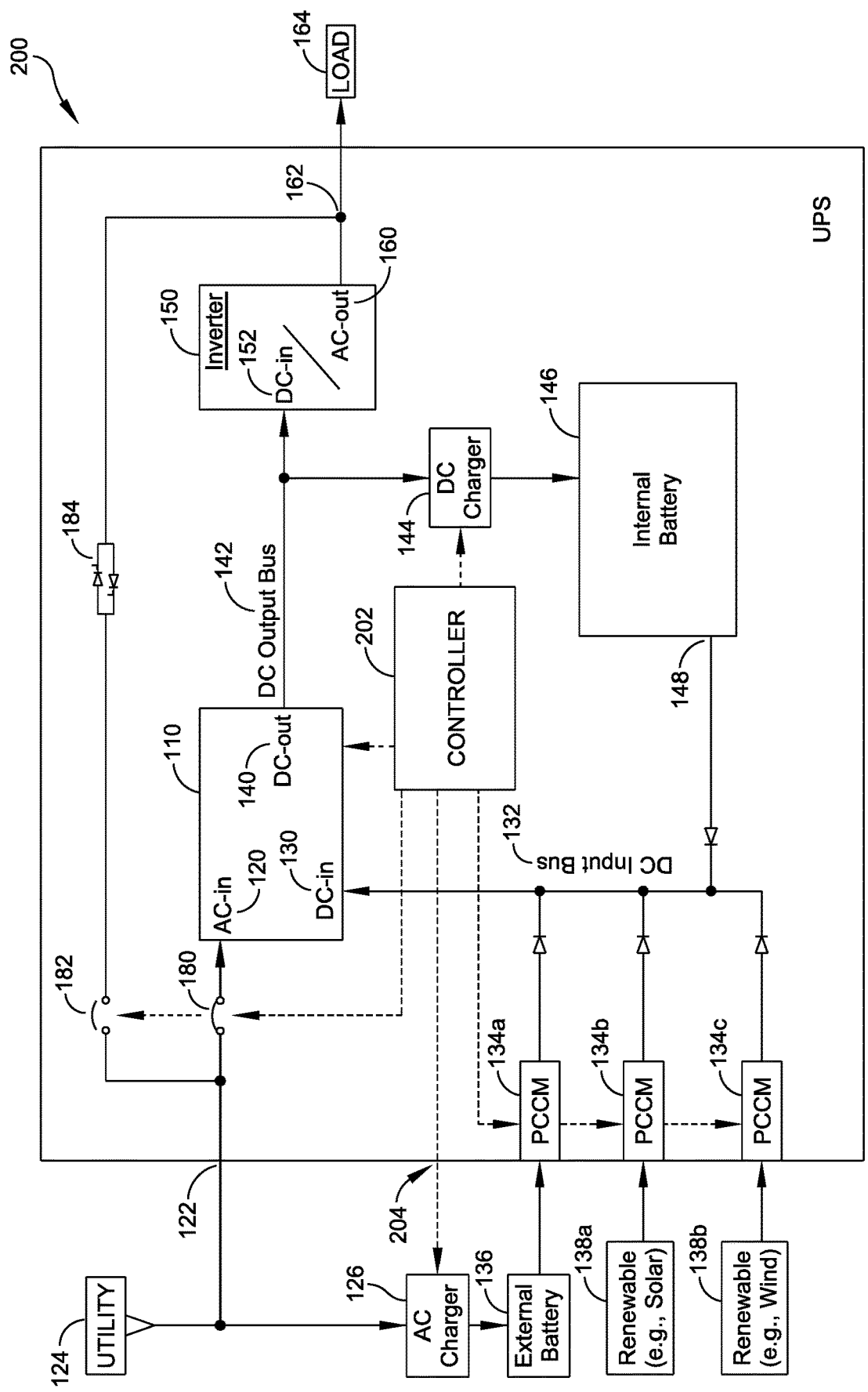
FIG. 2 is a block diagram of another example of a UPS having inputs configured for renewable energy systems, according to aspects of the invention.

FIG. 2 illustrates a further example of a UPS 200 in accord with aspects disclosed herein. The UPS 200 is similar to the UPS 100 except that the controller 202 includes further integration with the external battery 136 by including a control interface 204. The control interface 204 provides communication capability to the charger 126 so the UPS 200 may play a role in controlling the charge of the external battery 136. For example, if utility rates are high, e.g., above a threshold rate, and if the renewable sources 138 cannot provide enough power for what is demanded by the load 164, it may be desirable to temporarily use energy stored in the external battery 136 to supplement the power provided by the renewable sources 138 to power the load 164. In such cases, it would be preferable for the charger 126 to not actively charge the external battery 136 because doing so would use power from the utility grid 124 during the period of high rates and at least partially negate the benefit of using energy from the external battery 136. The UPS 200, however, may partially control the charger 126, or otherwise communicate with the charger 126, to prevent it from using the utility grid 124 to charge the external battery 136.

The control interface 204 may be, for example, a wired or wireless interface, and may be a USB interface, an RS-232 interface, or other serial interface, a parallel interface, a Bluetooth interface, a network interface such as an Ethernet or 802.11 (Wi-Fi) interface, and may carry any suitable communications protocol as known in the art to communicate with the charger 126. The control interface 204 may alternatively be configured to communicate with the external battery 136, or a separate controller provided within the external battery 136 or the charger 126, or a combination. In general, the external battery 136 and charger 126 may be a combined unit provided by a manufacturer different from the UPS 200, and the control interface 204 may be any suitable interface supported by the UPS 200 and the external battery 136 and/or charger 126.

Figure 3:
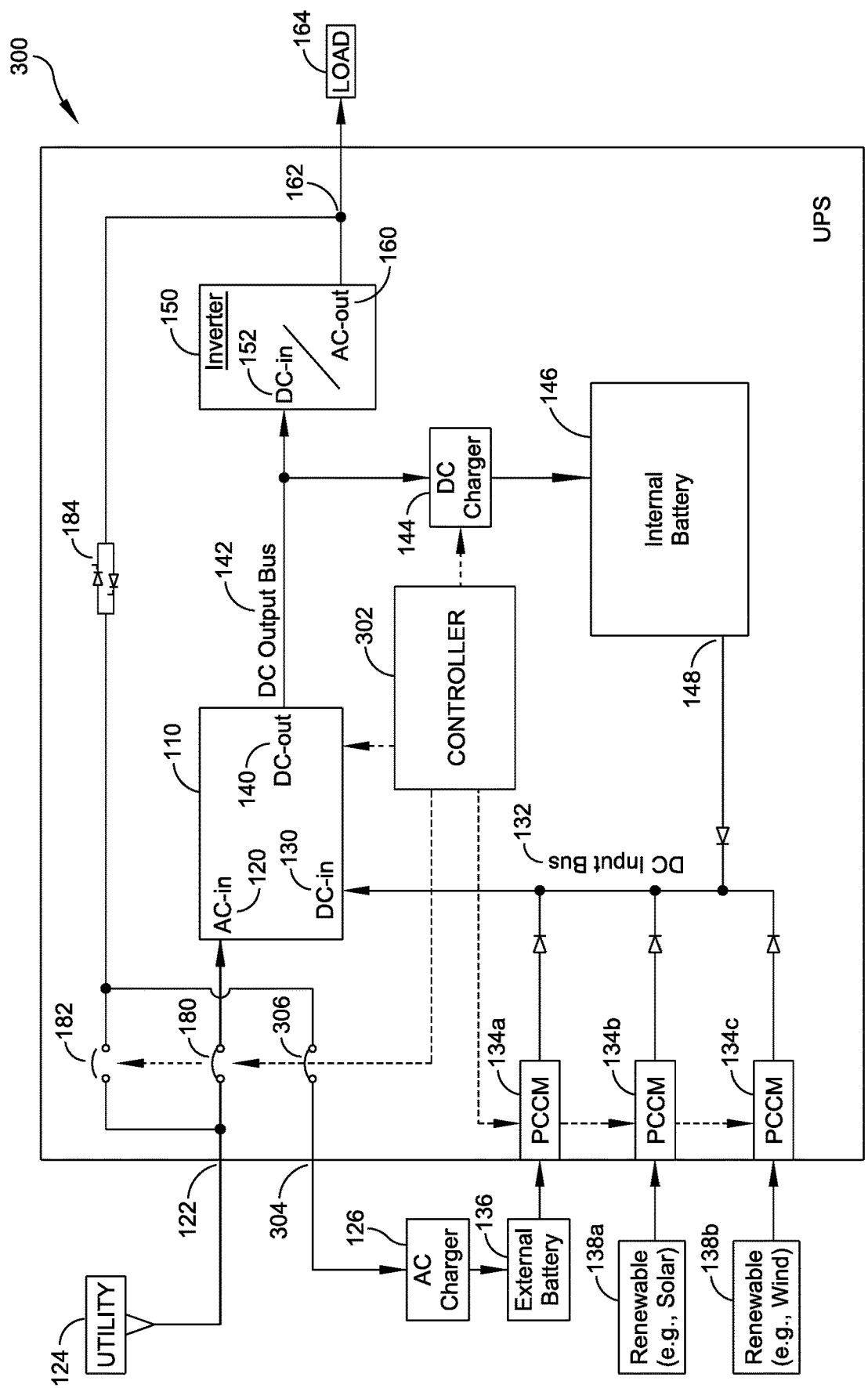
FIG. 3 is a block diagram of another example of a UPS having inputs configured for renewable energy systems, according to aspects of the invention.

FIG. 3 illustrates a further example UPS 300 in accord with aspects disclosed herein. The UPS 300 is similar to the UPS 200 in that it is capable of some control over an external battery 136, but in the example UPS 300 the external battery 136 (and charger 126) may not support any communication interface with the UPS 300. In this case, the UPS 300 includes a controller 302 capable of controlling power provided to an AC output 304 via a breaker 306 that may optionally provide or not provide AC power to the charger 126 and therefore the external battery 136. The breaker 306 is controlled by the controller 302 and the controller 302 can thereby control whether the external battery 136 has a power source for charging. Additionally, the breaker 306 may be configured to couple power to the charger 126 from the AC output bus 162, as shown, so that during times of outage of the utility 124, available excess energy from renewable sources 138 may be stored in the external battery 136. As discussed above, at certain times, such as during times of high electric rates, the UPS 300 may use the external battery 136 to supplement power from the renewable sources 138 and not allow the external battery 136 to recharge, from either the utility grid 124 or the AC output bus 162. The controller 302 can control the breaker 306 to disconnect AC power from being provided to the AC output 304, thereby preventing the charger 126 from using AC power to recharge the external battery 136.

Figure 4:
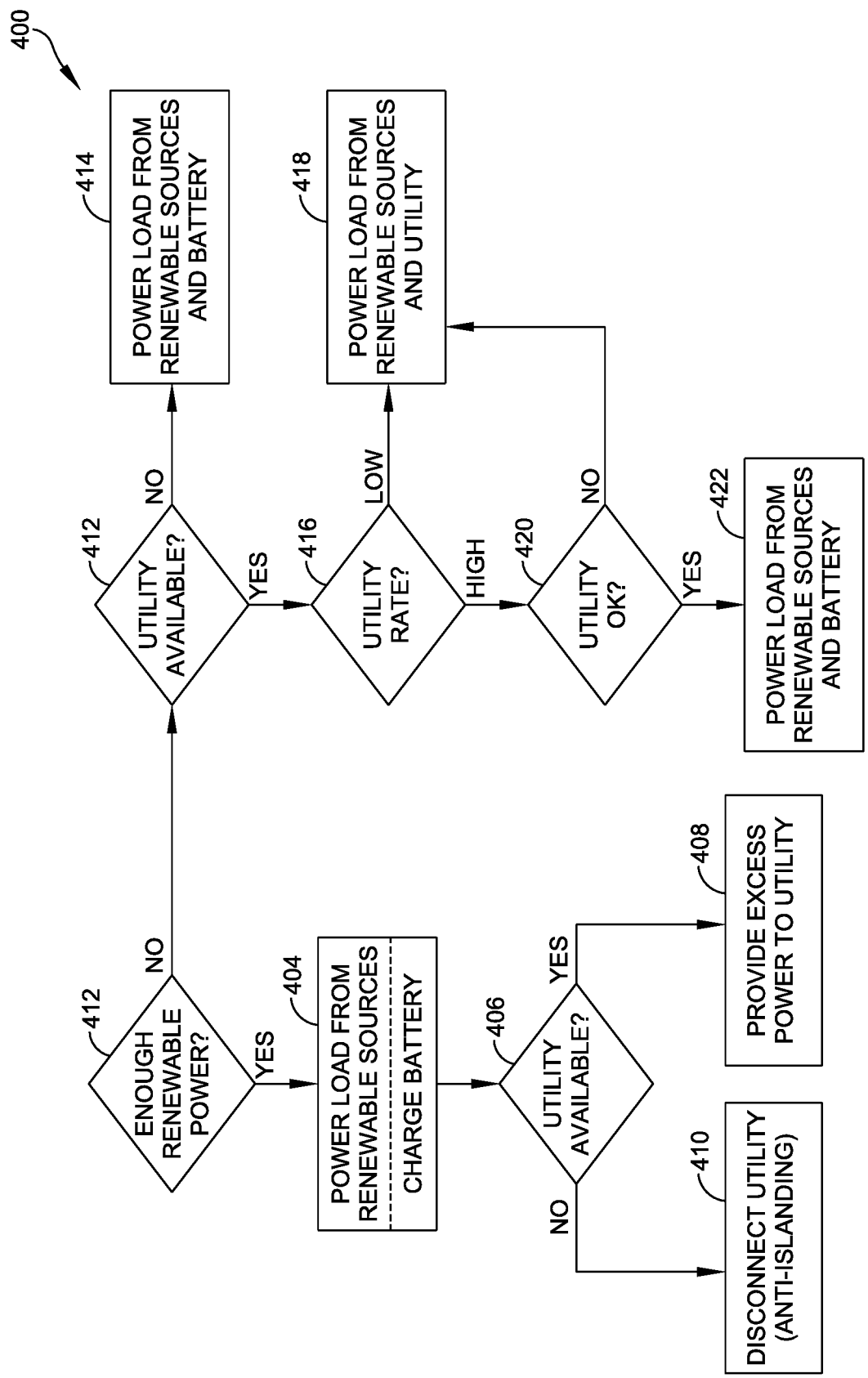
FIG. 4 is a flow chart illustrating one embodiment of a control process for a UPS having inputs for renewable energy systems, according to aspects of the invention.

FIG. 4 illustrates a portion of an example control algorithm 400 that may be implemented in a controller, e.g., any of the controllers 170, 202, 302, or others in accord with aspects and embodiments of UPS systems disclosed herein. At block 402, the algorithm 400 determines whether the renewable sources 138 can provide enough power to provide the power drawn by the load 164. If the renewable sources 138 can provide enough power, the renewable sources 138 are used to power the load 164 (block 404), and some power may be used to charge batteries (e.g., battery 136, 146). Because the renewable sources 138 are sufficient, no power is used from the utility grid 124 at block 404. If the utility grid 124 is connected and operating normally (block 406) the algorithm 400 may feed excess power back to the utility grid 124, at block 408, e.g., by connecting the AC input bus 122 to the AC output bus 162, by closing the feedback breaker 182 and/or controlling the bypass switch 184. If the utility grid 124 is not available (block 406), the UPS may disconnect the utility grid 124 from the AC output bus 162 (block 410) by opening the feedback breaker 182 and/or controlling the bypass switch 184. The state at block 410 implements anti-islanding wherein the UPS does not present an energized output to the utility grid 124.

Returning to block 402, if the renewable sources 138 cannot provide enough power for the load 164, the UPS determines whether the utility grid 124 is available to supplement the power required, at block 412. If the utility grid 124 is not available, the algorithm 400 uses the renewable sources 138 and energy from batteries (e.g., batteries 136, 146) (block 414) to provide power to the load 164. The algorithm 400 may allow a user-selectable option as to which battery among multiple available batteries should be used first, second, third, etc.

If the utility grid 124 is available (at block 412), the algorithm 400 may determine whether a utility rate is high or low (block 416). For example, a controller may have access to information about utility rates from a data communication with a utility or other reference database, or by user-selected or user entered utility rate information, or otherwise pre-stored utility rate information. If the utility rate is low, e.g., below a threshold rate, the algorithm 400 uses power from the utility grid 124 (block 418) to supplement the power provided by the renewable sources 138. If the utility rate is high, e.g., above a threshold rate, the algorithm 400 checks whether (at block 420) any of the batteries (e.g., battery 136, 146) has sufficient charge to supplement the power to the load 164. If any of the batteries has sufficient charge, the algorithm 400 uses the battery to supplement the power provided to the load 164 (block 422). The algorithm 400 may allow a user-selectable option as to which battery, among multiple available batteries having sufficient charge, should be used first, second, third, etc. For reference, the state at block 422 implements part of a peak shaving function, wherein energy stored in one or more batteries is used to provide power to the load 164 during periods of high utility rates.

Determining whether any of the batteries has sufficient charge (block 420) to supplement the power to the load 164 during periods of high utility rates (peak shaving, block 422) may include enforcing a minimum threshold charge. A battery may be determined to have insufficient charge to supplement the power to the load 164 if the battery does not have a minimum threshold charge. The minimum threshold charge may be an amount of charge required to power the load 164 for a determined period of time, e.g., to allow a controlled shutdown or reconfiguration of the load 164 before the battery is exhausted, e.g., in case of failure of other power sources. If it is determined that no battery has sufficient charge (at block 420), the algorithm 400 uses power from the utility grid 124 (block 418) despite a period of high utility rates.

The example algorithm 400 of FIG. 4 illustrates at least one set of relationships between various states of a UPS that may be implemented in a controller. The blocks of the algorithm 400 may be reorganized in numerous ways to maintain the relationship of the states or to establish different but similar states and relationships. Additionally, any one or more of the states or determinations shown in FIG. 4 may be optional and may be omitted in various embodiments. No particular order or arrangement of steps, determinations, or states is intended as limiting, and numerous variations will be evident to those of skill in the art with the benefit of this disclosure.

Figure 5:
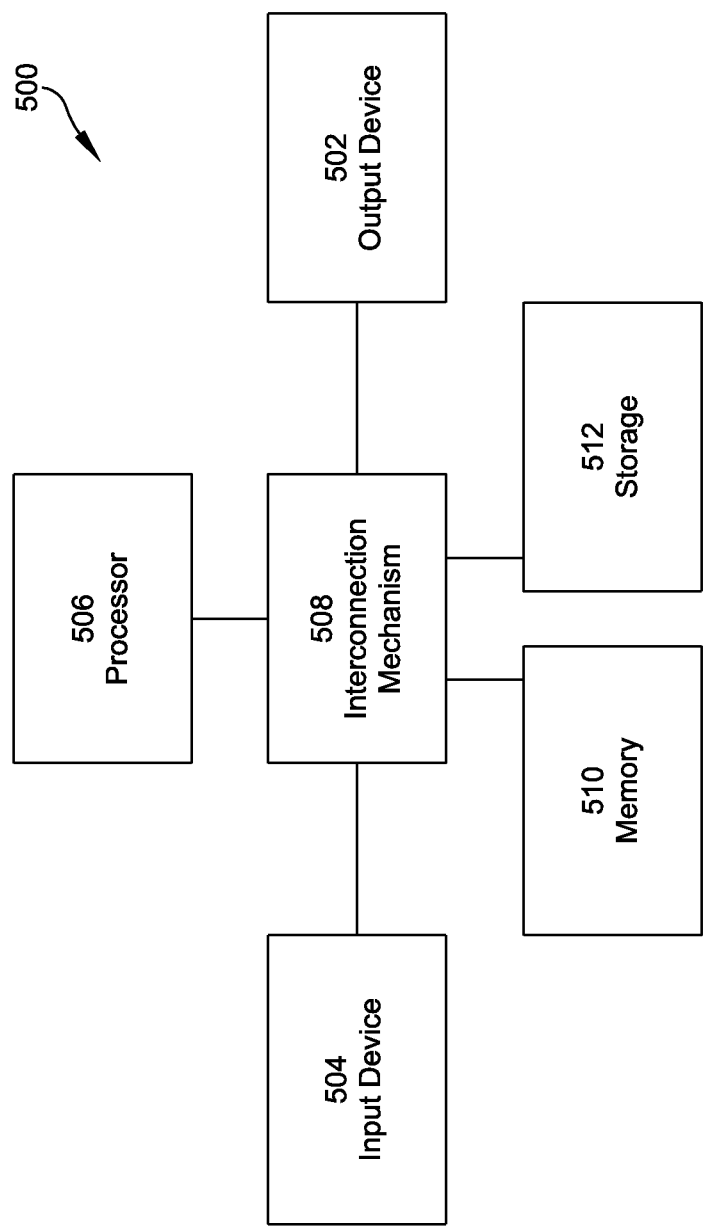
FIG. 5 is an example block diagram of computing components forming a system which may be configured to implement one or more aspects of the present invention.

FIG. 5 illustrates an example block diagram of computing components forming a computing system 500 which may be configured to implement one or more aspects disclosed herein. For example, the controllers 170, 202, 302, or similar may include a computing system 500, or a computing system 500 may be included in a UPS, e.g., UPS 100, 200, 300, to provide the function of a controller, or to provide a management interface to an operator, or to communicate with other devices, such as a communications interface to the utility grid 124, the charger 126, or renewable energy systems such as the renewable sources 138, for example.

The computing system 500 may include for example a computing platform such as those based on general computing processors, specialized processors, or microcontrollers. Computing system 500 may include specially-programmed, special-purpose hardware, for example, an application-specific integrated circuit (ASIC), or more generally designed hardware, such as a field programmable gate array (FPGA) or a general purpose processor. Additionally, various aspects of the present disclosure may be implemented as specialized software executing on a computing system 500 such as that shown in FIG. 5.

The computing system 500 may include a processor/ASIC 506 connected to one or more memory devices 510, such as a disk drive, memory, flash memory, embedded or on-chip memory, or other device for storing data. Memory 510 may be used for storing programs and data during operation of the computing system 500. Components of the computing system 500 may be coupled by an interconnection mechanism 508, which may include one or more buses and/or a network. The interconnection mechanism 508 enables communications of, e.g., data and instructions, to be exchanged between components of the computing system 500. The computing system 500 may also include one or more input devices 504, which may include, for example, a keyboard, a mouse, a touch screen, and the like. The computing system 500 may also include one or more output devices 502, which may include, for example, a display, a buzzer, alarm, or other audio indicator, a light, or other visual indicator, and the like. In addition, the computing system 500 may contain one or more interfaces (not shown) that may connect the computing system 500 to a communication network, in addition to or as an alternative to the interconnection mechanism 508.

The computing system 500 may include a storage component 512, which may include a computer readable and/or writeable nonvolatile medium in which signals may be stored to provide a program to be executed by the processor/ASIC 506 or to provide information stored on or in the medium to be processed by the program. The medium may, for example, be a disk or flash memory or other non-volatile memory including programmable read-only memory (PROM) of various types, and in some examples may include random access memory (RAM). In some embodiments, the processor may cause data to be read from the nonvolatile medium into another memory 510 that allows for faster access to the information by the processor/ASIC 506 than does the medium. This memory 510 may be a volatile, random access memory such as a dynamic random access memory (DRAM) or static memory (SRAM). It may be located in storage component 512 or in memory 510. The processor/ASIC 506 may manipulate the data within the memory 510 and copy the data to the storage 512 after processing is completed. Either or both of the memory 510 and storage 512 may be integrated in the processor/ASIC 506.

The computing system 500 may include a computer platform that is programmable using a high-level computer programming language. The computing system 500 may also be implemented using specially programmed or special purpose hardware, e.g. an ASIC. The processor/ASIC 506 may execute a core low-level operating system and may also execute a high-level operating system which may be, for example, a Windows operating system available from the Microsoft Corporation, a MAC OS System X or iOS operating system available from Apple Computer, a Solaris Operating System available from Sun Microsystems, a UNIX and/or LINUX operating system available from various sources, an Android operating system available from Google, Inc. Many other operating systems may be used, including bare metal and/or virtual computing systems.

In certain embodiments, a UPS has a controller in accord with aspects and embodiments disclosed herein and the controller may include a processor, which may be any of the above or other suitable processors, including ASICs, and may run an instruction set or operate upon other logic, to implement control of the UPS components as discussed above.

Some embodiments of UPS methods and systems, in accord with the aspects and embodiments disclosed herein, may provide single phase power or three phase power, and may receive input power in single phase or three phase form from any of the various power inputs, or any combination thereof. Embodiments disclosed herein can provide uninterruptible power to critical loads and/or to a utility grid using multiple power sources, including energy storage, renewable energy sources, and non-renewable energy sources. Conventional and modern sources, and future energy sources, are accommodated in some embodiments by various power conditioning and control modules (PCCM).

In certain embodiments, a converter such as the converter 110 may be or may include a power factor correction (PFC) circuit, and may aggregate power from one energy source at a time or may controllably aggregate power from multiple power sources, and may provide power to one or more energy outputs. Additionally, converter 110 may include power interfaces capable of both receiving and providing power, such as, for example, the AC input 120 may receive AC power input but may also act as a power output when, e.g., the converter 110 converts excess renewable or stored energy to feed power back to a utility grid, as discussed above.

In various embodiments, a controller such as controllers in accord with those discussed above may be a system control module (SCM) that is an intelligent power manager that selects which energy source or sources to use at any given time, to maintain power to the load and minimize energy costs. Such controllers may accomplish energy arbitrage by utilizing energy storage during peak electricity rates and recharging the energy storage during off peak rates.

UPS's and controllers in accord with those discussed above may be capable of selling surplus renewable or battery power back to the utility via a bypass loop or bi-directional frond end power converter (e.g., out the AC input 120), which may also be controlled by the controller.

UPS systems and methods in accord with those disclosed herein can increase availability and runtime, and accommodate demand during extended outages. In some embodiments, generators may further be provided or connected to any of the power inputs. UPS systems and methods in accord with those disclosed herein leverage the converters in UPS units as a supplement or replacement for inverters that may otherwise be provided with solar panels or wind generators, and the UPS units and converters disclosed herein may provide more reliable operation than dedicated solar inverters, as well as providing more flexibility in selection of power source to provide or maintain power to a load.

UPS systems and methods in accord with those disclosed herein are capable of operation in grid-connected and off-grid applications or environments, and may be used as part of a stability scheme in AC micro-grid environments. UPS systems and methods in accord with those disclosed herein may also be adapted for DC micro-grids, as are receiving renewed interest in the market.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
a renewable input configured to be coupled to a renewable power source and to receive renewable power from the renewable power source;
an energy storage component configured to receive and store energy and to provide stored power;
a utility input configured to be coupled to a power grid and to receive utility power from the power grid;
a DC input bus;
a DC output bus;
a first power conditioning and control module (PCCM) coupled to the DC input bus, having an input coupled to the renewable input, and configured to provide conditioned power to the DC input bus derived from the renewable source;
a second PCCM coupled to the DC input bus, having an input configured to couple to an external power source, and configured to provide conditioned power to the DC input bus derived from the external power source;
input power circuitry coupled to the utility input and the DC input bus and configured to receive the conditioned power provided by the first PCCM and/or the second PCCM, the utility power, and the stored power and provide DC power to the DC output bus, the DC input bus coupled between the input power circuitry and both of the first PCCM and the second PCCM;
an inverter coupled to the DC output bus, the inverter configured to receive the DC power provided by the input power circuitry to the DC output bus and provide output AC power to a load; and
a controller coupled to the input power circuitry, the inverter, the first PCCM, and the second PCCM, and configured to determine whether an amount of the renewable power exceeds an output power level provided to the load and to provide excess power from the renewable power to the energy storage component in response to a determination that the amount of renewable power exceeds the output power level provided to the load, the controller further configured to control the first PCCM to control the conditioned power provided by the first PCCM to the DC input bus.

2. The uninterruptible power supply of claim 1 wherein the controller is configured to determine whether the power grid is operational and to provide excess power from the renewable power to the power grid in response to the determination that the amount of the renewable power exceeds the output power level provided to the load and a determination that the power grid is operational.

3. The uninterruptible power supply of claim 2 wherein the controller is further configured to disconnect the utility input in response to determining that the power grid is not operational.

4. The uninterruptible power supply of claim 2 wherein the controller is further configured to control the input power circuitry and the inverter to provide the output power from the conditioned power provided by the first PCCM and/or the second PCCM and the stored power in response to determining that the power grid is not operational.

5. The uninterruptible power supply of claim 1 further comprising at least one maximum power point tracking circuit coupled to the renewable input, wherein the controller is further configured to determine whether the amount of the renewable power exceeds an output power level provided to the load by receiving information from the at least one maximum power point tracking circuit.

6. The uninterruptible power supply of claim 1 wherein the controller is further configured to determine whether a utility rate is higher than a threshold and to control a charger of the energy storage component to disable charging of the energy storage component in response to determining that the utility rate is higher than the threshold.

7. The uninterruptible power supply of claim 1, further comprising a DC charger coupled to the DC output bus and the energy storage component, the energy storage component coupled to the DC input bus and the DC charger.

8. The uninterruptible power supply of claim 1, further comprising a bypass switch configured to couple the utility input to an output of the inverter.

9. A method of providing output AC power to a load, the method comprising:
storing energy to provide stored power;
receiving renewable power from a renewable power source at an input of a first power conditioning and control module (PCCM);
receiving external power from an external power source at an input of a second PCCM;
providing, by the first PCCM, conditioned power derived from the renewable power source to a DC input bus, the DC input bus coupled to the first PCCM;
providing, by the second PCCM, conditioned power derived from the external power source to the DC input bus, the DC input bus coupled to the second PCCM;
controlling the first PCCM to control the conditioned power provided by the first PCCM to the DC input bus;
receiving utility power at a utility input from a power grid;
receiving, at input power circuitry, at least one of the utility power, the stored power, and the conditioned power provided by the first PCCM and/or the second PCCM via the DC input bus;
converting, with an inverter coupled to the input circuitry via a DC output bus, the conditioned power provided by the first PCCM and the second PCCM into at least a portion of the output AC power provided to the load, the DC input bus coupled between the input power circuitry and both of the first PCCM and the second PCCM;
determining whether the renewable power exceeds a threshold; and
providing a portion of the renewable power to at least one of an energy storage component and the power grid in response to a determination that the renewable power exceeds the threshold.

10. The method of claim 9 further comprising tracking a maximum power point of the renewable power source to determine whether the renewable power exceeds the threshold.

11. The method of claim 9 further comprising:
determining if the power grid is operational; and
providing a portion of the renewable power to the power grid in response to the determination that the renewable power exceeds the threshold and to a determination that the power grid is operational.

12. The method of claim 11 further comprising disconnecting a connection to the power grid in response to a determination that the power grid is not operational.

13. The method of claim 9 further comprising receiving the stored power from the energy storage component and converting the stored power into at least a portion of the output AC power in response to a determination that the renewable power does not exceed the threshold.

14. The method of claim 9 further comprising receiving the stored power from the energy storage component and converting the stored power into at least a portion of the output AC power in response to a determination that the renewable power does not exceed the threshold and a determination that a utility rate exceeds a utility rate threshold.

15. The method of claim 9 further comprising controlling a charger of the energy storage component to disable charging of the energy storage component in response to a determination that a utility rate exceeds a utility rate threshold.

16. The method of claim 9 further comprising coupling the utility input to an output of the inverter via a bypass switch.

17. An uninterruptible power supply comprising:
a utility input configured to be coupled to a power grid and to receive utility power from the power grid;
a renewable input configured to be coupled to a renewable power source and to receive renewable power from the renewable power source;
a DC input bus;
a DC output bus;
a first power conditioning and control module (PCCM) coupled to the DC input bus, having an input coupled to the renewable input, and configured to provide conditioned power to the DC input bus derived from the renewable source;
a second PCCM coupled to the DC input bus, having an input configured to couple to an external power source, and configured to provide conditioned power to the DC input bus derived from the external power source;
input power circuitry coupled to the utility input and the DC input bus and configured to receive the conditioned power provided by the first PCCM and/or the second PCCM, the utility power, and stored power and provide DC power to the DC output bus, the DC input bus coupled between the input power circuitry and both of the first PCCM and the second PCCM;

an inverter coupled to the DC output bus, the inverter configured to receive the DC power provided by the input power circuitry to the DC output bus and provide output AC power to a load; and means for balancing the utility power and the renewable power to provide the output AC power to the load, and to control the first PCCM to control the conditioned power provided by the first PCCM to the DC input bus.

18. The uninterruptible power supply of claim 17 wherein the means for balancing the utility power and the renewable power includes means for determining whether an amount of the renewable power exceeds an output power level provided to the load and to provide excess power from the renewable power to the power grid in response to a determination that the amount of renewable power exceeds the output power level provided to the load.

19. The uninterruptible power supply of claim 17 further comprising an energy storage component configured to receive and store energy and to provide the stored power, and wherein the means for balancing the utility power and the renewable power includes means for balancing the utility power, the renewable power, and the stored power, to provide output power to the load.

20. The uninterruptible power supply of claim 19 wherein the means for balancing the utility power, the renewable power, and the stored power further includes means for determining whether an amount of the renewable power exceeds an output power level provided to the load and to provide excess power from the renewable power to at least one of the power grid or the energy storage component in response to a determination that the amount of renewable power exceeds the output power level provided to the load.

21. The uninterruptible power supply of claim 17 wherein the renewable input is further configured to receive renewable power from a renewable power source that is at least one of a photovoltaic cell and a wind generator.

22. The uninterruptible power supply of claim 17 further comprising at least one maximum power point tracking circuit coupled to the renewable input, wherein the means for balancing the utility power and the renewable power includes means for determining whether an amount of the renewable power exceeds an output power level provided to the load by receiving information from the at least one maximum power point tracking circuit.

23. The uninterruptible power supply of claim 17 further comprising a bypass switch configured to couple the utility input to an output of the inverter.

* * * * *